(12) United States Patent  
Aparin

(10) Patent No.: US 9,025,646 B2  
(45) Date of Patent: May 5, 2015

(54) TRANSMIT LEAKAGE CANCELLATION

(71) Applicant: QUALCOMM Incorporated, San Diego, CA (US)

(72) Inventor: Vladimir Aparin, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 42 days.

(21) Appl. No.: 13/828,496

(22) Filed: Mar. 14, 2013

(65) Prior Publication Data

US 2014/0269864 A1    Sep. 18, 2014

(51) Int. Cl.
  *H04B 1/38*    (2006.01)
  *H04B 1/40*    (2006.01)
  *H04B 1/04*    (2006.01)

(52) U.S. Cl.
  CPC .............. *H04B 1/40* (2013.01); *H04B 1/0475* (2013.01); *H04B 1/525* (2013.01)

(58) Field of Classification Search
  CPC ... H04L 1/0001; H04L 1/0009; H04L 1/1854; G01R 31/31716; H04B 1/18
  USPC ......................................... 375/221, 219, 220
  See application file for complete search history.

(56) References Cited

U.S. PATENT DOCUMENTS 4,835,496 A *   5/1989   Schellenberg et al. ....... 333/128
7,711,329 B2    5/2010   Aparin et al.
7,995,973 B2    8/2011   Dent et al.
2008/0225929 A1*  9/2008   Proctor et al. ................. 375/214
2011/0116403 A1*  5/2011   Kahrizi et al. ................. 370/252
2011/0195672 A1   8/2011   Pratt et al.
2012/0294337 A1* 11/2012   Kim et al. ...................... 375/219
2013/0343440 A1* 12/2013   Negus et al. ................... 375/219

FOREIGN PATENT DOCUMENTS

WO    2008118898    10/2008

OTHER PUBLICATIONS

Aparin, "A New Method of TX Leakage Cancelation in W/CDMA and GPS Receivers", IEEE RFIC Symo., 2008, pp. 87-90.
Aparin, et al., "An integrated LMS adaptive filter of TX leakage for CDMA receiver front ends", IEEE Journal of Solid-State Circuits, vol. 41, No. 5, 2006, pp. 1171-1182.
Boyle, et al., "Real-time Adaptation of Mobile Antenna Impedance Matching", Loughborough Antennas & Propagation Conference, 2010, pp. 22-25.
Darabi, et al., "Highly Integrated and Tunable RF Front Ends for Reconfigurable Multiband Transceivers: A Tutorial," IEEE Transactions on Circuits and Systems, Regular Papers, vol. 58, No. 9, Sep. 2011, pp. 2038-2050.

(Continued)

*Primary Examiner* — Qutbuddin Ghulamali
(74) *Attorney, Agent, or Firm* — Fountainhead Law Group P.C.

(57) ABSTRACT

A transceiver for reducing transmit signal leakage is described. The transceiver includes a downconverter that downconverts a receive signal to produce a feedback signal. The transceiver also includes a weight learning module that correlates the feedback signal with a transmit signal to obtain a weight. The transceiver further includes a transmit leakage estimator that obtains an estimated transmit leakage signal based on the weight and the transmit signal. The transceiver also includes a transmit leakage reducer that reduces the transmit leakage in the receive signal based on the estimated transmit leakage signal.

42 Claims, 7 Drawing Sheets

(56) References Cited

OTHER PUBLICATIONS

Frotzscher, et al., "Baseband Analysis of Tx Leakage in WCDMA Zero-IF-Receivers", ISCCSP 2008, 3rd International Symposium on Communications, Control and Signal Processing, 2008, pp. 129-134.

Mikhemar, et al., "An On-Chip Wideband and Low-Loss Duplexer for 3G/4G CMOS Radios," IEEE Symposim on VLSI Circuits 2010, pp. 129-130.

International Search Report and Written Opinion—PCT/US2014/022785—ISA/EPO—May 21, 2014.

* cited by examiner

TRANSMIT LEAKAGE CANCELLATION

TECHNICAL FIELD

The present disclosure relates generally to wireless devices for communication systems. More specifically, the present disclosure relates to systems and methods for canceling transmit (Tx) leakage in a transceiver.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

These electronic devices may communicate wirelessly with each other and with a network. As the demand for information by these electronic devices has increased, the downlink throughput, as well as desired functionality, has also increased.

Electronic devices have also become smaller and cheaper. To facilitate both decrease in size and decrease in cost, additional circuitry and more complex circuitry are being used on integrated circuits. Benefits may be realized by improvements to electronic devices that allow an electronic device to reuse circuitry while increasing the functionality of the electronic device.

SUMMARY

A transceiver for reducing transmit signal leakage is described. The transceiver includes a downconverter that downconverts a receive signal to produce a feedback signal. The transceiver also includes a weight learning module that correlates the feedback signal with a transmit signal to obtain a weight. The transceiver further includes a transmit leakage estimator that obtains an estimated transmit leakage signal based on the weight and the transmit signal. The transceiver also includes a transmit leakage reducer that reduces the transmit leakage in the receive signal based on the estimated transmit leakage signal.

The receive signal may include transmit leakage and a desired receive signal. The weight learning module may include multipliers, summers, and narrow pass filters. An input of the summer may be coupled to an output of a low noise amplifier. An output of the summer may be coupled to an input of a low noise amplifier.

The summer may subtract the estimated transmit leakage signal from the receive signal to obtain a desired receive signal. The estimated transmit leakage signal may not include any portion of the desired receive signal, due to zero correlation between a baseband receive signal and the transmit signal. The weight may be obtained by determining signal gain due to correlated portions of the feedback signal and the transmit signal. The weight may be a direct current signal.

The transmit leakage estimator may include only passive components that draw zero current. The transmit signal leakage may leak onto the receive signal through a duplexer. The duplexer may be implemented using surface acoustic wave filters, bulk acoustic wave filters, ceramic filters, LC filters or transmission filters.

The transmit leakage estimator may include multiple quadrature hybrids, multiple transistors and a power combiner. The transmit signal may be a coupled transmit signal obtained from an upconverted transmit signal. The transmit signal may be a baseband transmit signal.

A method for reducing transmit signal leakage is also described. A receive signal is downconverted to produce a feedback signal. The feedback signal is correlated with a transmit signal to obtain a weight. An estimated transmit leakage signal is obtained based on the weight and the transmit signal. The transmit leakage in the receive signal is reduced based on the estimated transmit leakage signal.

The transmit leakage in the receive signal may be reduced using a summer that subtracts the estimated transmit leakage signal from the receive signal to obtain a desired receive signal. The estimated transmit leakage signal may be obtained using a transmit leakage estimator that includes only passive components that draw zero current. The transmit leakage estimate may be obtained using a circuit that includes multiple quadrature hybrids, multiple transistors, and a power combiner.

A computer-program product for reducing transmit signal leakage on a transceiver is described. The computer-program product includes a non-transitory computer-readable medium with instructions thereon. The instructions include code for causing the transceiver to downconvert a receive signal to produce a feedback signal. The instructions also include code for causing the transceiver to correlate the feedback signal with a transmit signal to obtain a weight. The instructions further include code for causing the transceiver to obtain an estimated transmit leakage signal based on the weight and the transmit signal. The instructions also includes code for causing the transceiver to reduce the transmit leakage in the receive signal based on the estimated transmit leakage signal.

A transceiver for reducing transmit signal leakage is also described. The transceiver includes means for downconverting a receive signal to produce a feedback signal. The transceiver also includes means for correlating the feedback signal with a transmit signal to obtain a weight. The transceiver further includes means for obtaining an estimated transmit leakage signal based on the weight and the transmit signal. The transceiver also includes means for reducing the transmit leakage in the receive signal based on the estimated transmit leakage signal.

DETAILED DESCRIPTION

Figure 1:
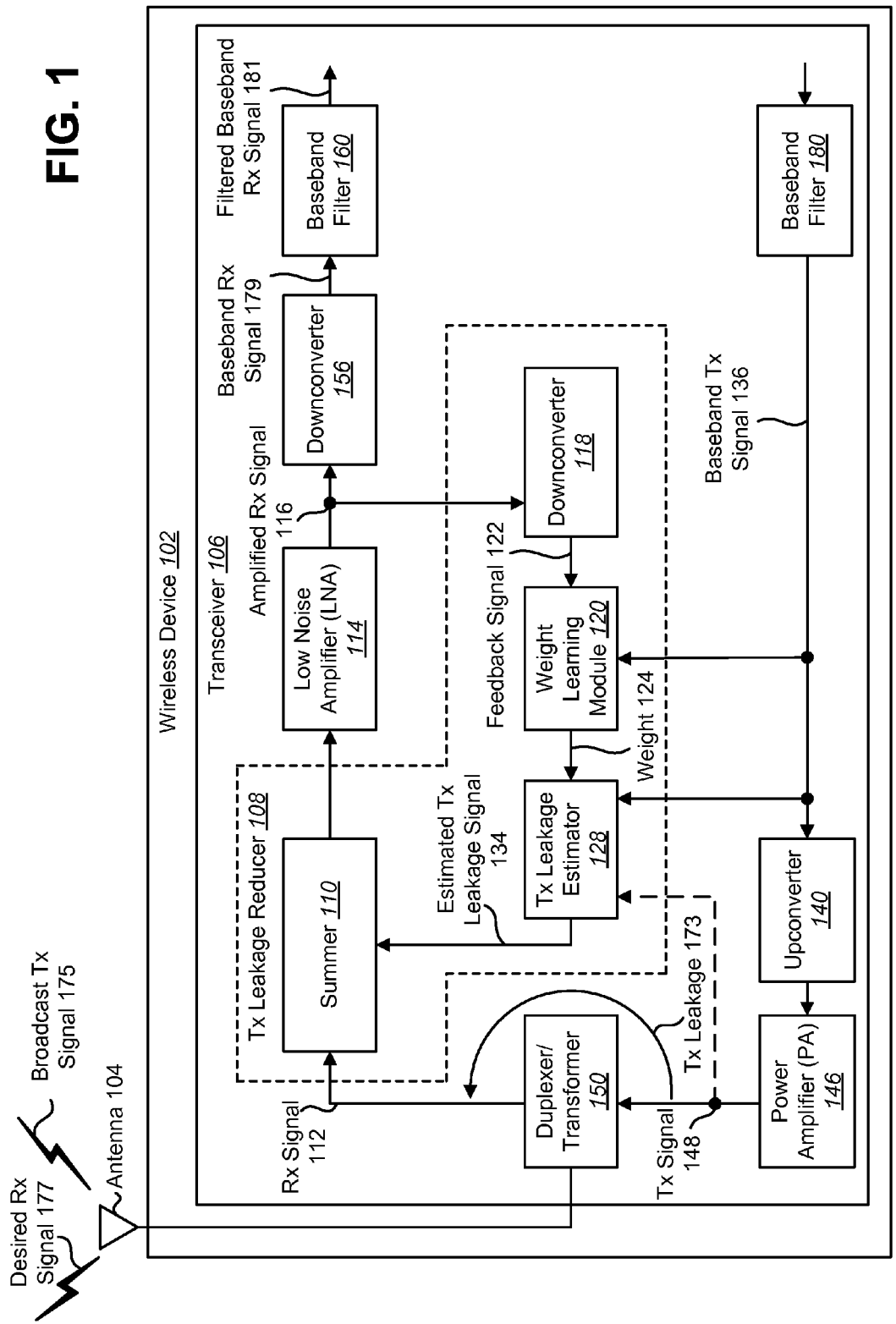
FIG. 1 shows a wireless device for use in the present systems and methods.

FIG. 1 shows a wireless device 102 for use in the present systems and methods. The wireless device 102 may be configured to reduce Tx leakage in a receive (Rx) signal 112. A wireless device 102 may be a wireless communication device or a base station. A base station is a station that communicates with one or more wireless communication devices. A base station may also be referred to as, and may include some or all of the functionality of, an access point, a broadcast transmitter, a NodeB, an evolved NodeB (eNB), etc. Additional detail regarding base stations is given below in FIG. 8.

A wireless communication device may also be referred to as, and may include some or all of the functionality of, a terminal, an access terminal, a user equipment (UE), a subscriber unit, a station, etc. A wireless communication device may be a cellular phone, a personal digital assistant (PDA), a wireless device, a wireless modem, a handheld device, a laptop computer, a PC card, compact flash, an external or internal modem, a wireline phone, etc. A wireless communication device may be mobile or stationary. Additional detail regarding wireless communication devices is given below in FIG. 8.

The wireless device 102 may include an antenna 104. The antenna 104 may be used for both receiving a desired Rx signal 177 and transmitting a broadcast Tx signal 175. The broadcast Tx signal 175 may include the Tx signal 148. In some configurations, the wireless device 102 may include multiple antennas.

The wireless device 102 may include a transceiver 106. The transceiver 106 may be configured as a feedback-based canceler that reduces the amount of Tx leakage 173 in an Rx signal 112. The Rx signal 112 may include both a desired Rx signal 177 and Tx leakage 173.

According to systems and methods described herein, Tx leakage 173 may be reduced in the Rx signal 112 without attenuating the desired Rx signal 177 for narrowly spaced Tx signals 148 and desired Rx signals 177. An example of narrowly spaced Tx signals 148 and desired Rx signals 177 may be LTE (long term evolution) 10 MHz (megahertz) signals with 30 MHz Tx-Rx separation as in LTE band 17.

The systems and methods described herein may also allow for a tunable front-end filter. For example, the wireless device 102 may be configured to include a tunable filter or a hybrid transformer. The tunable front-end filter may assist in rejection of Tx leakage.

The transceiver 106 may include a receive (Rx) portion and a transmit (Tx) portion. The Rx portion may include a duplexer/transformer 150, a transmit (Tx) leakage reducer 108, a low noise amplifier (LNA) 114, a downconverter 156 and a baseband filter 160. The Tx leakage reducer 108 may include a summer 110, a downconverter 118, a weight learning module 120 and a Tx leakage estimator 128 as part of a feedback loop. The Rx portion of the transceiver 106 may reduce the Tx leakage 173 in the Rx signal 112 obtained by passing the desired Rx signal 177 from the antenna 104 through the duplexer/transformer 150 to the input of the Tx leakage reducer 108. The downconverter 156 may output a baseband Rx signal 179 to a baseband filter 160.

The Tx portion of the transceiver 106 may include a baseband filter 180, an upconverter 140, a power amplifier (PA) 146 and a duplexer/transformer 150. The duplexer/transformer 150 may be employed by both the Rx portion and the Tx portion.

The Tx portion of the transceiver 106 may produce a Tx signal 148 to be transmitted from the antenna 104, for example, as the broadcast TX signal 175. The Tx signal 148 may be produced by first upconverting and then amplifying a baseband Tx signal 136.

The wireless device 102 may be configured to transmit a broadcast Tx signal 175 and receive desired Rx signals 177 through a single antenna 104. In full-duplex mode, the wireless device 102 may transmit broadcast Tx signals 175 and receive desired Rx signals 177 at the same time. However, in full-duplex systems, a portion of the Tx signal 148 may leak onto the received Rx signal 112 as Tx leakage 173 (e.g., through the duplexer/transformer 150). In other words, in a full-duplex system, the receiver on a wireless device 102 may be jammed by Tx leakage 173 from the transmitter. This jamming may produce distortion in the receive path and may interfere with the desired Rx signal 177. Furthermore, noise from the active transceiver 106 components may be introduced into the Rx signal 112. Any undesired Tx noise or Tx leakage 173 in the Rx signal 112 may degrade the quality and sensitivity of the Rx signal 112.

The Tx signal 148 may be at a different frequency than the desired Rx signal 177. For example, the Tx signal 148 may be offset 8 MHz in personal communications service (PCS) bands and 45 MHz in the cellular band from the desired Rx signal 177. However, even when the Tx signal 148 is at a different frequency than the desired Rx signal 177, Tx leakage 173 may still occur and degrade the desired Rx signal 177.

In some configurations, the Tx signal 148 may be at the same frequency as the desired Rx signal 177. For example, there may be no offset between the desired Rx signal 177 frequency and the Tx signal 148 frequency. Even when the desired Rx signal 177 and the Tx signal 148 share the same frequency or nearby frequencies, the systems and methods described herein may be employed to reduce and/or eliminate Tx leakage 173 from the Rx signal 112. In this manner, even when the desired Rx signal 177 and the Tx signal 148 share the same frequency or nearby frequencies, degradation of the desired Rx signal 177 may be reduced.

In some wireless device 102 configurations, multiple broadcast Tx signals 175 and desired Rx signals 177 are sent and received simultaneously. Employing multiple signals allows a wireless device 102 to send and receive more data at one time. However, as more and more signals are simultaneously transmitted and received, additional circuitry is required. In addition, as the number of simultaneously transmitted and received signals and their bandwidth increase, the frequency gap between the received and transmitted signals narrows and filtering out Tx leakage 173 and Tx noise from each Rx signal 112 becomes more challenging.

In some configurations, the duplexer/transformer 150 may be a duplexer. The duplexer allows for bi-directional (duplex) communication over a single path, such as a single antenna 104. In general, a duplexer can isolate the Tx signal 148 from the Rx signal 112 by 50 to 55 dB (decibels).

A duplexer may allow the transceiver 106 to both transmit and receive signals at the antenna 104. A duplexer may include one or more filters, such as a surface acoustic wave (SAW) filter or a bulk acoustic wave (BAW) filter, to isolate the desired frequency received at the antenna 104. For example, the duplexer may be a surface acoustic wave (SAW) duplexer.

In configurations where multiple frequency bands are employed in full-duplex mode, the transceiver 106 may require multiple duplexers. In other words, for each Tx band and/or Rx band, an additional duplexer may be needed. However, additional duplexers may result in more necessary components and more required die space.

In some configurations, the duplexer/transformer 150 may be a transformer, such as a hybrid transformer. The transceiver 106 may serve as a feedback-based canceler. In some known configurations, the transceiver 106 is used to cancel Tx leakage using a feedback loop. The feedback loop may downconvert the Rx signal 112 using a Tx local oscillator (LO) to obtain a feedback signal 122. The feedback signal 122 is then passed through a low pass filter. The low pass filter may preserve the downconverted Tx leakage 173 in the feedback signal 122 by filtering out the downconverted desired Rx signal 177. The preserved Tx leakage is then upconverted using the same Tx local oscillator (LO) and subtracted from the Rx signal 112, which includes both the desired Rx signal 177 and Tx leakage 173. In this manner, the Tx leakage 173 may be subtracted from the Rx signal 112. However, this approach can be problematic.

For example, for a narrowly-spaced Tx signal 148 and desired Rx signal 177, the low pass filter, in an attempt to preserve the Tx leakage 173, may not remove all of the desired Rx signal 177 from the feedback signal 122. Thus, portions of the desired Rx signal 177 may be upconverted by the feedback loop and subtracted out from the receive signal 112, thus resulting in an attenuation of the desired Rx signal 177. For instance, in the LTE (long term evolution) 700 MHz (megahertz) band, the desired Rx signal 177 and the Tx signal 148 may each have bandwidths of 10 MHz, separated by a 30 MHz gap.

Other known configurations use the Rx local oscillator (LO) to downconvert the Rx signal 112 to produce a feedback signal 122 and the same Rx local oscillator (LO) to upconvert the filtered feedback signal 122. These configurations may use a high pass filter to preserve the Tx leakage in the feedback signal 122. However, in these configurations, the high-pass filter may not remove all of the desired Rx signal 177 from the feedback signal 122 if the Tx signal 148 and the desired Rx signal 177 are narrowly-spaced. Thus, portions of the desired Rx signal 177 may be upconverted by the Rx local oscillator (LO) and subtracted out from the receive signal 112, thus resulting in an attenuation of the desired Rx signal 177.

In some configurations, the transceiver 106 may obtain an Rx signal 112. For example, a signal may be received at the antenna 104 and filtered by the duplexer/transformer 150 to obtain an Rx signal 112. The Rx signal 112 may be provided to the Tx leakage reducer 108. The output of the Tx leakage reducer 108 may be provided to a low noise amplifier (LNA) 114 that outputs an amplified Rx signal 116.

The amplified Rx signal 116 may be used in a feedback loop to estimate Tx leakage. The amplified Rx signal 116 may be provided to a downconverter 118 to produce a feedback signal 122. The feedback signal 122 may be provided to a weight learning module 120.

The weight learning module 120 may process the feedback signal 122 and the baseband Tx signal 136 to obtain a weight 124. In some configurations, the baseband Tx signal 136 may include an inphase (I) component (e.g., signal) and a quadrature (Q) component (e.g., signal). For example, the baseband Tx signal 136 may include baseband Tx signal I and baseband Tx signal Q. Similarly, the weight 124 may be separated into weight I and weight Q. For the sake of simplicity, only one signal path is shown in FIG. 1. However, multiple signal paths may be employed in some configurations of the transceiver 106.

The weight 124 may be a complex correlation coefficient produced by multiplying input signals and then integrating or low-pass filtering the result. For example, the weight 124 may provide the correlation coefficient between the feedback signal 122 and the baseband Tx signal 136. Multiplying the feedback signal 122 and the baseband Tx signal 136 may produce a direct current (DC) signal due to correlated portions of these two signals and an alternating current (AC) signal due to uncorrelated portions of these two signals.

The feedback signal 122 includes the downconverted Tx leakage 173, which is highly correlated to the baseband Tx signal 136. The feedback signal 122 also includes the downconverted desired Rx signal 177, which may not be correlated to the baseband Tx signal 136. Therefore, multiplying the downconverted desired Rx signal 177 included in the feedback signal 122 by the baseband Tx signal 136 produces an alternating current (AC) signal, which is then filtered out by an integrator or a low-pass filter inside the weight learning module 120. Because the desired output of the weight learning module 120 is direct current (DC), the bandwidth of the low-pass filter inside the weight learning module 120 may be set close to 0 Hz such that all alternating current (AC) signals may be suppressed to zero.

The Tx leakage estimator 128 may apply the weight 124 to the baseband Tx signal 136 to obtain an estimated Tx leakage signal 134. In this configuration, after applying the weight 124 to the baseband Tx signal 136, the resulting signal may be upconverted to the Tx local oscillator (LO) frequency to produce the estimated Tx leakage signal 134.

In some configurations, the Tx leakage estimator 128 may estimate the estimated Tx leakage signal 134 by applying the weight 124 to a Tx signal 148, rather than the baseband Tx signal 136. In this configuration, no upconversion is needed inside the Tx leakage estimator 128 because the Tx signal 148 is already at the Tx local oscillator (LO) frequency.

The estimated Tx leakage signal 134 may be provided to the summer 110. The estimated Tx leakage signal 134 may be subtracted from the Rx signal 112 using the summer 110. In this manner, the Tx leakage may be reduced or eliminated from the Rx signal 112, which includes both the desired Rx signal 177 and Tx leakage 173, by subtracting the estimated Tx leakage signal 134 from the Rx signal 112.

Because the baseband Tx signal 136 and the Tx signal 148 do not include the desired Rx signal 177, the estimated Tx leakage signal 134 does not include the desired Rx signal 177 either. Therefore, no part of the desired Rx signal 177 is subtracted from the Rx signal 112. Thus, the desired Rx signal is not degraded and attenuation of the desired Rx signal is avoided. The Rx signal 112 may be amplified by the low noise amplifier (LNA) 114 either before or after the estimated Tx leakage signal 134 is subtracted from the Rx signal 112.

In some configurations, the desired Rx signal 177 may be provided to the low noise amplifier (LNA) 114 after being output from the summer 110. The desired Rx signal 177 may be downconverted by the downconverter 156, filtered by the baseband filter 160 and output from the transceiver 106 for digital processing as a filtered baseband Rx signal 181.

In other configurations, the Rx signal 112 may be amplified by the low noise amplifier (LNA) 114 before the estimated Tx leakage signal 134 is subtracted out by the summer 110. Thus, depending on the configuration, the low noise amplifier (LNA) 114 may be placed prior to the input of the summer 110.

Figure 2:
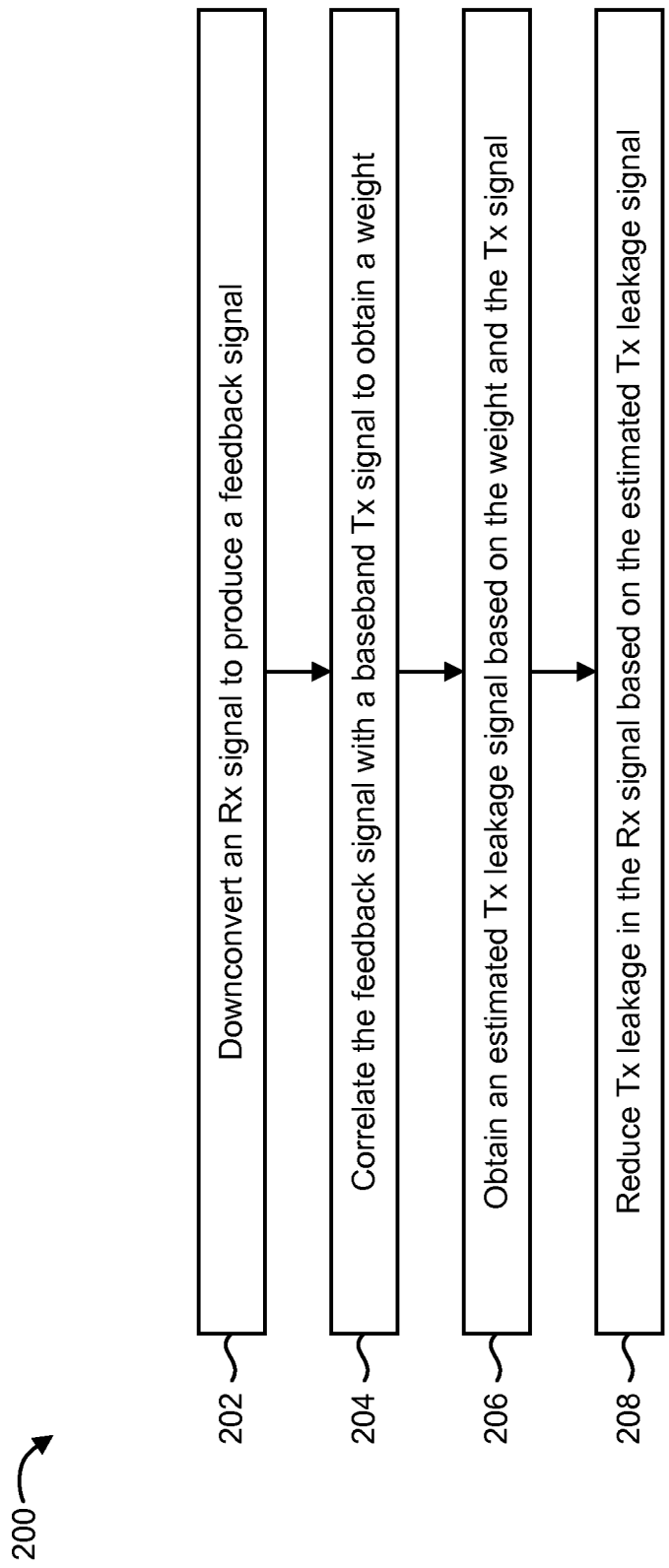
FIG. 2 is a flow diagram of a method for canceling Tx leakage.

FIG. 2 is a flow diagram of a method 200 for canceling Tx leakage. The method 200 may be performed by a wireless device 102. The wireless device 102 may be a wireless communication device or a base station. The wireless device 102 may downconvert 202 an Rx signal 112 to produce a feedback signal 122. The downconversion may be part of a feedback loop. The Rx signal 112 may include a desired Rx signal 177 and Tx leakage 173 (i.e., leakage from the Tx signal transmitted by the wireless device 102). In one configuration, the Rx signal 112 may be amplified by a low noise amplifier (LNA) 114 before being downconverted 202.

The wireless device 102 may correlate 204 the feedback signal 122 with a baseband Tx signal 136 to obtain a weight

124. This may be performed by a weight learning module 120. In some configurations, the weight 124 may be complex and may have a DC value.

The wireless device 102 may obtain 206 an estimated Tx leakage signal 134 based on the weight 124 and the baseband Tx signal 136. This may be performed by the Tx leakage estimator 128. The wireless device 102 may apply the weight 124 to the baseband Tx signal 136 and then upconvert the result to the Tx LO frequency to obtain an estimated Tx leakage signal 134. Because only the weight 124 and the baseband Tx signal 136 are used to obtain estimated Tx leakage, there is no desired Rx signal 177 in the estimated Tx leakage signal 134. In other words, the Tx leakage reducer 108 will not subtract the desired Rx signal 177 from the Rx signal 112. This prevents the desired Rx signal from being degraded.

In one configuration, the Tx leakage estimator 128 may produce the estimated Tx leakage signal 134 by applying the weight 124 to the baseband Tx signal 136 and then upconverting the result to the Tx local oscillator (LO) frequency. In another configuration, the Tx leakage estimator 128 may produce the estimated Tx leakage signal 134 by applying the weight 124 to a Tx signal 148, which is already centered at the Tx local oscillator (LO) frequency. In this configuration, the Tx signal 148 is obtained by upconverting the baseband Tx signal 136 and amplifying the result. The feedback loop may be completed and the estimated Tx leakage signal 134 may then be provided to the summer 110.

In the configurations where the estimated Tx leakage signal 134 is produced from the baseband Tx signal 136, the baseband Tx signal 136 may include an I and Q signal, such as baseband Tx signal I and baseband Tx signal Q. Similarly, the weight 124 may be separated into weight I and weight Q. In this manner, weight I may be applied to baseband Tx signal I and weight Q may be applied to baseband Tx signal Q. The I signal and the Q signal may be upconverted by local oscillator (LO) I and local oscillator (LO) Q signals, respectively, and combined to form the estimated Tx leakage signal 134.

In the configuration in which the estimated Tx leakage signal 134 is produced from the Tx signal 148, the Tx signal 148 may be split into inphase (I) and quadrature (Q) components inside the Tx leakage estimator 128. Similarly, the weight 124 may be separated into weight I and weight Q. In this manner, weight I may be applied to Tx signal I and weight Q may be applied to Tx signal Q. The I signal and the Q signal may be combined to form the estimated Tx leakage signal 134.

The wireless device 102 may reduce 208 Tx leakage in the Rx signal 112. Because the Rx signal 112 includes both the desired Rx signal 177 and the Tx leakage 173, subtracting the estimated Tx leakage signal 134 from the Rx signal 112 may result in only the desired Rx signal 177 remaining (in the amplified Rx signal 116). The summer 110 in the Tx leakage reducer 108 may subtract the estimated Tx leakage signal 134 from the Rx signal 112. In this manner, no desired Rx signal 177 is subtracted from the Rx signal 112.

In some configurations, the desired Rx signal 177 may be provided to the low noise amplifier (LNA) 114 after being output from the summer 110. The desired Rx signal 177 may be downconverted by the downconverter 156, filtered by the baseband filter 160 and output from the transceiver 106 for digital processing as a filtered baseband Rx signal 181.

In other configurations, the Rx signal 112 may be amplified by the low noise amplifier (LNA) 114 before the estimated Tx leakage signal 134 is subtracted out by the summer 110. Thus, depending on the configuration, the low noise amplifier (LNA) 114 may be placed at the input of the summer 110.

Figure 3:
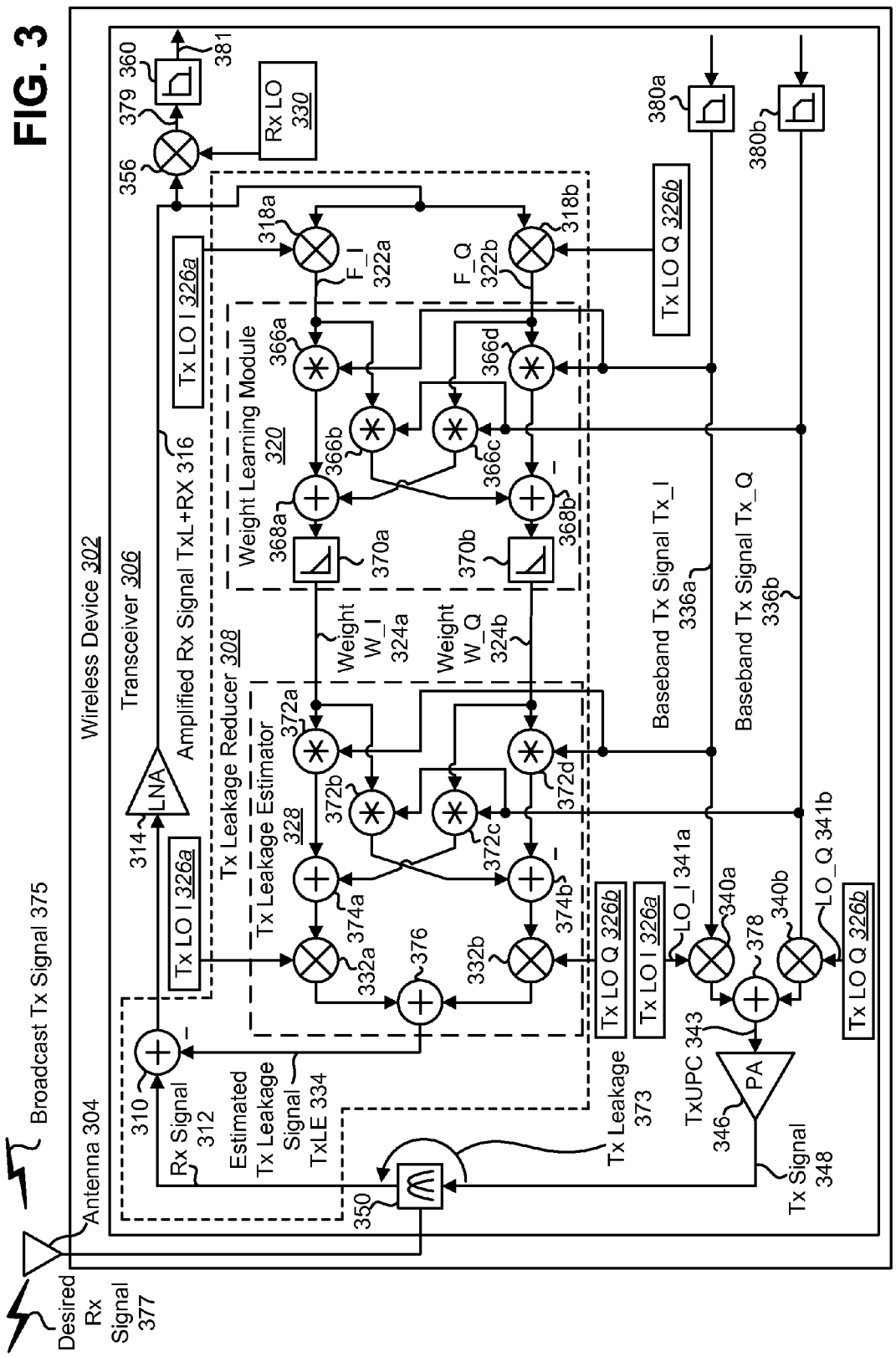
FIG. 3 is a block diagram illustrating one configuration of a wireless device that includes Tx leakage cancellation.

FIG. 3 is a block diagram illustrating one configuration of a wireless device 302 that includes Tx leakage cancellation. The wireless device 302 may include an antenna 304 and a transceiver 306. The transceiver 306 in FIG. 3 may be one example of the transceiver 106 described in connection with FIG. 1.

The transceiver 306 may include a Tx leakage reducer 308. The Tx leakage reducer 308 may include a summer 310, a weight learning module 320 and a Tx leakage estimator 328. The weight learning module 320 may include multipliers 366*a-d*, summers 368*a-b* and narrow pass filters 370*a-b*. The Tx leakage estimator 328 may include multipliers 372*a-d* and summers 374*a-b*.

The weight learning module 320 and the Tx leakage estimator 328 may be part of a feedback loop. The feedback loop and the baseband Tx signal 336 may be separated into an I component and a Q component. For example, the baseband Tx signal 336 may be separated into baseband Tx signal Tx_I 336*a* and baseband Tx signal Tx_Q 336*b*.

The transceiver 306 may also include a duplexer 350, downconverters 318*a-b* and 356, upconverters 332*a-b* and 340*a-b*, summers 376 and 378, baseband filters 360 and 380*a-b* and a power amplifier (PA) 346. The downconverter 356 may be driven by an Rx local oscillator (LO) 330. For example, the amplified Rx signal 316 may be down-converted at the downconverter 356 to produce a baseband Rx signal 379. The baseband Rx signal 379 may be filtered at the baseband filter 360 to produce a filtered baseband Rx signal 381, which may be used for digital processing.

The downconverter 318*a* may be driven by a Tx local oscillator (LO) I 326*a* and the downconverter 318*b* may be driven by a Tx local oscillator (LO) Q 326*b*. The upconverters 332*a* and 340*a* may be driven by a Tx local oscillator (LO) I 326*a* and the upconverters 332*b* and 340*b* may be driven by a Tx local oscillator (LO) Q 326*b*. The summers 376 and 378 may combine the I and Q components into one signal. For example, the summer 378 may combine the upconverted baseband Tx signal Tx_I 336*a* and the upconverted baseband Tx signal Tx_Q 336*b*. The combined signal outputted from the summer 378 (e.g., the Tx signal 348) may be amplified by the power amplifier (PA) 346 and transmitted from the antenna 304. For example, the Tx signal 348 may be transmitted as a broadcast Tx signal 375. In some configurations, the Tx signal 348 may leak into the Rx signal 312 in the form of Tx leakage 373.

The wireless device 302 may receive a desired Rx signal 377 at the antenna 304. The desired Rx signal 377 may be isolated by the duplexer 350 to obtain an Rx signal 312. As described previously, the duplexer 350 may isolate the frequency of the desired Rx signal 377 and filter out undesired signal frequencies. In the case of multiple signals and/or bands, multiple duplexers 350 may be employed.

The Rx signal 312 may be processed through the Tx leakage reducer 308. The Tx leakage reducer 308 may first sum the Rx signal 312 with an estimated Tx leakage signal 334 to subtract out the estimated Tx leakage signal 334. The output of the summer 310 may be amplified by a low noise amplifier (LNA) 314 to obtain an amplified Rx signal 316.

The amplified Rx signal 316 may be downconverted. For example, the amplified Rx signal 316 may be downconverted at the downconverter 318*a* using the Tx local oscillator (LO) I 326*a* to produce a feedback I signal 322*a*. The amplified Rx signal 316 may also be downconverted at the downconverter 318*b* using the Tx local oscillator (LO) Q 326*b* to produce a feedback Q signal 322*b*.

The feedback I signal 322*a* and the feedback Q signal 322*b* may be provided to the weight learning module 320. The feedback I signal 322a and the feedback Q signal 322b may still include the desired Rx signal 377 as well as Tx leakage 373. The weight learning module 320 may perform complex multiplication using multipliers 366a-d and summers 368a-b. The feedback I signal 322a may be multiplied with the baseband Tx signal Tx_I 336a using a first multiplier 366a. The feedback I signal 322a may be multiplied with the baseband Tx signal Tx_Q 336b using a second multiplier 366b. The feedback Q signal 322b may be multiplied with the baseband Tx signal Tx_Q 336b using a third multiplier 366c. The feedback Q signal 322b may be multiplied with the baseband Tx signal Tx_I 336a using a fourth multiplier 366d. The output of the third multiplier 366c may be cross coupled and combined with the output of the first multiplier 366a using the first summer 368a. The output of the second multiplier 366b may be cross coupled and combined with the output of the fourth multiplier 366d using the second summer 368b.

The weight learning module 320 may also apply narrow pass filters 370a-b to the output signals from the summers 368a-b, respectively. The narrow pass filters 370a-b may produce a complex correlation coefficient (e.g., weight 324) between the feedback signal 322 and the Tx baseband signal 336. The complex multiplication of the feedback signal 322 and the Tx baseband signal 336 may produce a direct current (DC) signal due to correlated portions of these two signals and an alternating current (AC) signal due to uncorrelated portions of these two signals. The direct current (DC) signal, which is preserved by the narrow pass filters 370a-b, may indicate information about the Tx leakage magnitude and phase. The alternating current (AC) signal, which carries information about all other signals that are not correlated with the baseband Tx signal 336 (such as the desired Rx signal 377), may be suppressed to zero.

The weight 324 may be provided to the Tx leakage estimator 328. The weight 324 may be multiplied in the complex domain with the baseband Tx signal 336 and then upconverted to produce a scaled estimation of Tx leakage. The Tx leakage estimator 328 may employ multipliers 372a-d and summers 374a-b to perform a complex multiplication of the baseband Tx signal 336 and the weight 324. The outputs of the summers 374a-b may be upconverted by upconverters 332a-b to form an estimated Tx leakage signal 334. The Tx leakage reducer 308 may subtract the estimated Tx leakage signal 334 from the Rx signal 312 to remove Tx leakage 373 from the Rx signal 312 to obtain the desired Rx signal 377.

The baseband Tx signal 336 may include an inphase component (i.e., the baseband Tx signal Tx_I 336a) and a quadrature component (i.e., the baseband Tx signal Tx_Q 336b). The baseband Tx signal 336 can be written in the complex domain as TxBB=Tx_I+j*Tx_Q, where j is the imaginary unit ($j^2=-1$). The multipliers 340a-b and the summer 378 may upconvert the baseband Tx signal 336 to the Tx LO frequency. It may be assumed that the Tx LO I signal 341a is equal to cos(ω*t) and the Tx LO Q signal 341b is equal to sin(ω*t). The Tx LO signal 341 can be written in the complex domain as LO=cos(ω*t)+j sin(ω*t)=$e^{(j*\omega*t)}$, where ω is the Tx LO frequency and t is time. The signal at the output of the summer 378 is described in Equation (1):

$$TxUPC=2*(Tx\_I*\cos(\omega*t)+Tx\_Q*\sin(\omega*t)). \quad (1)$$

Equation (1) is a real signal (i.e., in the real domain). The factor of 2 is used to shorten the further derivations. Equation (1) may be rewritten for the complex signals TxBB and LO by using the Euler formula of Equation (2):

$$TxUPC = (Tx\_I + j*Tx\_Q)e^{(-j*\omega*t)} + (Tx\_I - j*Tx\_Q)e^{(j*\omega*t)} \quad (2)$$
$$= TxBB*\overline{LO} + \overline{TxBB}*LO.$$

In Equation (2), the overbar refers to complex conjugation. After amplification by the power amplifier 346, a portion of the Tx signal 348 is coupled through the duplexer 350 to the receiver input and then amplified by the low noise amplifier (LNA) 314. The total gain of the Tx signal from the output of the summer 378 to the output of the low noise amplifier (LNA) 314 may be referred to as G_Tx, which is defined according to Equation (3):

$$G\_Tx=|G\_Tx|*e^{(j*\phi)}=G\_Tx\_I+j*G\_Tx\_Q. \quad (3)$$

In Equation (3), |G_Tx| is the magnitude of the Tx leakage gain, φ is the phase of the Tx leakage gain, G_Tx_I is the real part of the Tx leakage gain and G_Tx_Q is the imaginary part of the Tx leakage gain. The Tx leakage at the output of the low noise amplifier (LNA) 314 is described using Equation (4):

$$TxL = 2*|G\_Tx|*[Tx\_I*\cos(\omega*t+\varphi)+Tx\_Q*\sin(\omega*t+\varphi)] \quad (4)$$
$$= TxBB*\overline{LO*G\_Tx} + \overline{TxBB}*LO*G\_Tx.$$

The composite signal at the output of the low noise amplifier (LNA) 314 also includes the amplified desired Rx signal 377. For simplicity, it is assumed that the desired Rx signal 377 is at the same frequency as the Tx signal 348. The desired Rx signal 377 at the output of the low noise amplifier (LNA) 314 can then be described using Equation (5):

$$Rx=RxBB*\overline{LO*G\_Rx}+\overline{RxBB}*LO*G\_Rx. \quad (5)$$

In Equation (5), RxBB is the baseband signal of the desired Rx signal 377 (defined as RxBB=Rx_I+j*Rx_Q). Also, in Equation (5), G_Rx is the total gain of the desired Rx signal from baseband to the output of the low noise amplifier (LNA) 314 (defined as G_Rx=G_Rx_I+j*G_Rx_Q). Therefore, the composite signal at the output of the low noise amplifier (LNA) 314 is defined using Equation (6):

$$C=TxL+Rx. \quad (6)$$

The downconverters 318a-b may multiply the composite signal C by the complex Tx LO signal, resulting in the feedback signal F of Equation (7):

$$F = (TxL + Rx)*LO \quad (7)$$
$$= TxBB*\overline{G\_Tx} + \overline{TxBB}*LO^2*G\_Tx +$$
$$RxBB*\overline{G\_Rx} + \overline{RxBB}*LO^2*G\_Rx.$$

In Equation (7), it is taken into account that LO*$\overline{LO}$=1. According to Equation (7), the feedback signal includes second-harmonic responses due to LO$^2$=$e^{(-j*2*\omega*t)}$ and baseband responses TxBB*$\overline{G\_Tx}$+RxBB*$\overline{G\_Rx}$. The second-harmonic responses of a downconverter are typically attenuated by a low-pass filter (not shown in FIG. 3), leaving only baseband responses as illustrated in Equation (8):

$$F = TxBB*\overline{G\_Tx} + RxBB*\overline{G\_Rx} \quad (8)$$
$$= F\_I + j*F\_Q.$$

The multipliers 366a-d and the summers 368a-b of the weight learning module 320 may perform a complex multiplication of a complex conjugate of the feedback signal F (i.e., F_I 322a and F_Q 322b) and the baseband Tx signal TxBB 336, described in Equation (9):

$$\overline{F} * TxBB = (F\_I - j * F\_Q) * (Tx\_I + j * Tx\_Q) \qquad (9)$$
$$= F\_I * Tx\_I + F\_Q * Tx\_Q + j * (F\_I * Tx\_Q - F\_Q * Tx\_I).$$

The real part of Equation (9), F_I*Tx_I+F_Q*Tx_Q, may be computed by the multipliers 366a, 366c and the summer 368a. The imaginary part of Equation (9), F_I*Tx_Q−F_Q*Tx_I, may be computed by the multipliers 366b, 366d and the summer 368b. Taking into account that F=TxBB*$\overline{G\_Tx}$+RxBB*$\overline{G\_Rx}$, the result of the complex multiplication $\overline{F}$*TxBB is Equation (10):

$$\overline{F} * TxBB = (\overline{TxBB} * G\_Tx + \overline{RxBB} * G\_Rx) * TxBB \qquad (10)$$
$$= |TxBB|^2 * G\_Tx + \overline{RxBB} * TxBB * G\_Rx.$$

The narrow pass filters 370a-b may perform time averaging and amplification of $\overline{F}$*TxBB to obtain the complex weight 324 of Equation (11):

$$W = G\_Filt * \langle \overline{F} * TxBB \rangle \qquad (11)$$
$$= G\_Filt * (\langle |TxBB|^2 \rangle * G\_Tx + \langle \overline{RxBB} * TxBB \rangle * G\_Rx).$$

In Equation (11), G_Filt is the real gain of the narrow pass filters 370a-b, <|TxBB|²> is the power of the baseband Tx signal 336 (referred to as the dispersion) and <$\overline{RxBB}$*TxBB> is the complex correlation coefficient between the baseband Rx signal and the baseband Tx signal 336. Because the baseband Rx signal and the baseband Tx signal 336 are not correlated, <$\overline{RxBB}$*TxBB>=0, and therefore the weight 324 may be defined as W=G_Filt*(<|TxBB|²>*G_Tx=W_I+j*W_Q. The weight W_I 324a is defined as W_I=G_Filt*<|TxBB|²>*G_I. The weight W_Q 324b is defined as W_Q=G_Filt*<|TxBB|²>*G_Q. The learned weight W doesn't include any information of the desired Rx signal 377.

The multipliers 372a-d and the summers 374a-b may perform a complex multiplication of the complex conjugate of the learned weight W and the baseband Tx signal TxBB 336 as described in Equation (12):

$$\overline{W} * TxBB = (W\_I - j * W\_Q) * (Tx\_I + j * Tx\_Q) \qquad (12)$$
$$= W\_I * Tx\_I + W\_Q * Tx\_Q + j *$$
$$(W\_I * Tx\_Q - W\_Q * Tx\_I).$$

The real part of this complex multiplication, W_I*Tx_I+W_Q*Tx_Q, may be computed by the multipliers 372a, 372c and the summer 374a. The imaginary part of this complex multiplication, W_I*Tx_Q−W_Q*Tx_I, may be computed by the multipliers 372b, 372d and the summer 374b. Taking into account that W=G_Filt*(<|TxBB|²>*G_Tx, rewritten Equation (12) may be rewtten as Equation (13):

$$\overline{W} * TxBB = G\_Filt * (<|TxBB|^2> * \overline{G\_Tx} * TxBB. \qquad (13)$$

The multipliers 332a-b and the summer 376 perform upconversion of the signal $\overline{W}$*TxBB to the Tx LO frequency, which creates an estimate of the Tx leakage described in Equation (14):

$$TxLE = \overline{W} * TxBB * \overline{LO} + W *$$
$$\overline{TxBB} * LO = G\_Filt * (<|TxBB|^2> * (\overline{G\_Tx} * TxBB *$$
$$\overline{LO} + G\_Tx * \overline{TxBB} * LO. = G\_Filt * (<|TxBB|^2> * TxL \qquad (14)$$

According to Equation (14), the Tx leakage estimate TxLE produced by the Tx leakage estimator 328 is equal to the Tx leakage TxL at the output of the low noise amplifier (LNA) 314 times a real factor G_Filt*(<|TxBB|²> (i.e., the TxLE has the same phase as the TxL, but a different magnitude). The Tx leakage estimate TxLE doesn't include any part of the desired Rx signal 377, due to zero correlation between the baseband Rx signal RxBB and the baseband Tx signal TxBB 336.

The attenuation of the Tx leakage occurs due to the negative feedback around the low noise amplifier (LNA) 314. TxL_In may be defined as the Tx leakage 373 passed from the duplexer 350 to the input of the summer 310. The summer 310 may subtract the estimated Tx leakage signal TxLE 334 from the input Tx leakage TxL_In. Thus, the signal Tx_In−TxLE is applied to the input of the low noise amplifier (LNA) 314 (along with the desired Rx signal 377). If the gain of the low noise amplifier (LNA) 314 is equal to G_LNA, then the Tx leakage at the output of the low noise amplifier (LNA) 314 is equal to G_LNA*(TxL_In−TxLE). As described in Equation (4) above, the Tx leakage at the output of the low noise amplifier (LNA) 314 is defined as TxL. Therefore, Equation (15) may be derived:

$$TxL = G\_LNA * (TxL\_In - TxLE). \qquad (15)$$

Substituting TxLE=G_Filt*<|TxBB|²>*TxL from Equation (14) into Equation (15) yields Equation (16):

$$TxL = \frac{G\_LNA * TxL\_In}{1 + G\_LNA * G\_Filt * \langle |TxBB|^2 \rangle}. \qquad (16)$$

The numerator G_LNA*TxL_In of Equation (16) shows the Tx leakage at the output of the low noise amplifier (LNA) 314 without the negative feedback, which is simply the input Tx leakage times the gain of the low noise amplifier (LNA) 314. The denominator 1+G_LNA*G_Filt*<|TxBB|²> of Equation (16) shows the attenuation factor of the Tx leakage due to the negative feedback. The value G_LNA*G_Filt*<|TxBB|²> is the open-loop gain of the negative feedback.

Because the Tx leakage estimator 328 applies direct current (DC) signals (e.g., weights 324a-b) to the baseband Tx signal Tx_I 336a and the baseband Tx signal Tx_Q 336b, the estimated Tx leakage signal 334 is void of any desired Rx signal 377. Therefore, when the estimated Tx leakage signal 334 is subtracted from the Rx signal 312 at the Tx leakage reducer 308, none of the desired Rx signal 377 is canceled or attenuated. Thus, the desired Rx signal 377 is not degraded by the Tx leakage reducer 308. This allows for only Tx leakage 373 to be canceled from the Rx signal 312, leaving only the desired Rx signal 377. Furthermore, the removal of the desired Rx signal 377 by the weight learning module 320, based on zero correlation of the baseband Rx signal and the baseband Tx signal 336, allows the Rx and Tx frequency signals to be very close to each other or even overlap. Thus, according to the systems and methods described herein, Rx and Tx frequency bands may be adjacent to each other, or may even overlap one another, while still maintaining a strong desired Rx signal 377 with negligible levels of Tx leakage 373.

The duplexer 350 may be implemented using surface acoustic wave (SAW), bulk acoustic wave (BAW), ceramic, LC (inductor-capacitor), transmission line or other filters. The duplexer 350 may also use a circulator or other isolation structure, such as a hybrid transformer. The summer 310 may be implemented using a simple wire connection, a coupler or other known techniques. The summer 310 may also be part of the duplexer 350. In other words, the duplexer 350 may combine the functionality of isolation between the Tx and Rx paths with the functionality of subtracting the estimated Tx leakage signal 334 from the signal provided to the low noise amplifier (LNA) 314 input.

Figure 4:
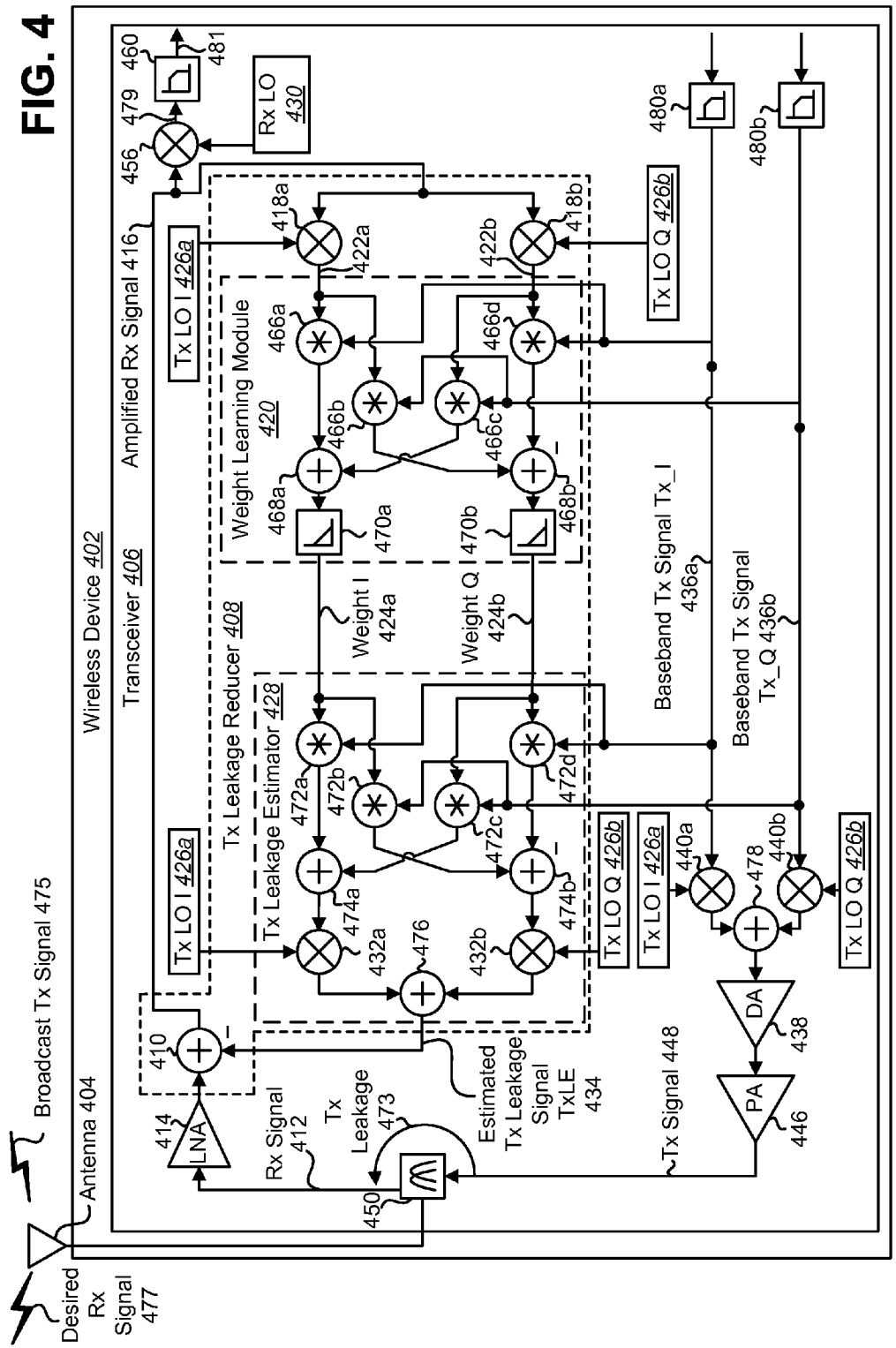
FIG. 4 is a block diagram illustrating another configuration of a wireless device that includes Tx leakage cancellation.

FIG. 4 is a block diagram illustrating another configuration of a wireless device 402 that includes Tx leakage cancellation. The wireless device 402 may include an antenna 404 and a transceiver 406. The transceiver 406 in FIG. 4 may be one example of the transceiver 106 described in connection with FIG. 1.

The transceiver 406 may include a Tx leakage reducer 408, a weight learning module 420 and a Tx leakage estimator 428. The Tx leakage reducer 408 may include a summer 410 and a low noise amplifier (LNA) 414. The weight learning module 420 may include multipliers 466a-d, summers 468a-b and narrow pass filters 470a-b. The Tx leakage estimator 428 may include multipliers 472a-d and summers 474a-b.

The weight learning module 420 and the Tx leakage estimator 428 may be part of a feedback loop. The feedback loop and the baseband Tx signal 436 may be separated into an I component and a Q component. For example, the baseband Tx signal 436 may be separated into baseband Tx signal I 436a and baseband Tx signal Q 436b. For simplicity, only the I component will be discussed in relation to the feedback loop and the baseband Tx signal 436. It should be appreciated that corresponding features and processing may be similarly performed for the Q component.

The transceiver 406 may also include a duplexer 450, downconverters 418a-b and 456, upconverters 432a-b and 440a-b, summers 476 and 478, baseband filters 460 and 480a-b, low pass filters 442a-b, a power amplifier (PA) 446 and a drive amplifier (DA) 438. The downconverter 456 may be driven by an Rx local oscillator (LO) 430. For example, the amplified Rx signal 416 may be down-converted at the downconverter 456 to produce a baseband Rx signal 479. The baseband Rx signal 479 may be filtered at the baseband filter 460 to produce a filtered baseband Rx signal 481, which may be used for digital processing.

The downconverter 418a may be driven by a Tx local oscillator (LO) I 426a and the downconverter 418b may be driven by a Tx local oscillator (LO) Q 426b. The upconverters 432a and 440a may also be driven by the Tx local oscillator (LO) I 426a and the upconverters 432b and 440b may also be driven by the Tx local oscillator (LO) Q 426b. The summers 476 and 478 may combine the I and Q components into one signal. For example, the output of the summer 476 may be an estimated Tx leakage signal 434.

The wireless device 402 may receive a desired Rx signal 477 at the antenna 404. The desired Rx signal 477 may be filtered/isolated by the duplexer 450 to obtain an Rx signal 412. In other words, the duplexer 450 may output an Rx signal 412 while simultaneously processing a Tx signal 448 for transmission. The Tx signal 448 may be transmitted at the antenna 404 as a broadcast Tx signal 475. In some configurations, the Tx signal 448 may leak into the Rx signal 412 in the form of Tx leakage 473.

The Rx signal 412 may be processed by the Tx leakage reducer 408. The Tx leakage reducer 408 may first amplify the Rx signal 412 using the low noise amplifier (LNA) 414. The output of the low noise amplifier (LNA) 414 may then be summed at the summer 410 to remove the estimated Tx leakage signal 434 from the Rx signal 412. The Tx leakage reducer 408 may output an amplified Rx signal 416.

The amplified Rx signal 416 may be downconverted. For example, the amplified Rx signal 416 may be downconverted at the downconverter 418a using the Tx local oscillator (LO) I 426a to produce a feedback I signal 422a. The amplified Rx signal 416 may also be downconverted at the downconverter 418b using the Tx local oscillator (LO) Q 426b to produce a feedback Q signal 422b.

The feedback I signal 422a and the feedback Q signal 422b may be provided to the weight learning module 420. The feedback I signal 422a and the feedback Q signal 422b may still include the desired Rx signal 477 as well as Tx leakage 473. The weight learning module 420 may perform complex multiplication using multipliers 466a-d and summers 468a-b. The feedback I signal 422a may be multiplied with the baseband Tx signal I 436a using a first multiplier 466a. The feedback I signal 422a may be multiplied with the baseband Tx signal Q 436b using a second multiplier 466b. The feedback Q signal 422b may be multiplied with the baseband Tx signal Q 436b using a third multiplier 466c. The feedback Q signal 422b may be multiplied with the baseband Tx signal I 436a using a fourth multiplier 466d. The output of the third multiplier 466c may be cross coupled and combined with the output of the first multiplier 466a using the first summer 468a. The output of the second multiplier 466b may be cross coupled and combined with the output of the fourth multiplier 466d using the second summer 468b.

The weight learning module 420 may also apply narrow pass filters 470a-b to the output signals from the summers 468a-b, respectively. The narrow pass filters 470a-b may produce a complex correlation coefficient (e.g., weight 424) between the feedback signal 422 and the Tx baseband signal 436. The complex multiplication of the feedback signal 422 and the Tx baseband signal 436 may produce a direct current (DC) signal due to correlated portions of these two signals and an alternating current (AC) signal due to uncorrelated portions of these two signals. The direct current (DC) signal, which is preserved by the narrow pass filters 470a-b, may indicate information about the Tx leakage 473 magnitude and phase. The alternating current (AC) signal, which carries information about all other signals that are not correlated with the baseband Tx signal 436 (such as the desired Rx signal 477), may be suppressed to zero.

The weight 424 may be provided to the Tx leakage estimator 428. The weight 424 may be multiplied in the complex domain with the baseband Tx signal 436 and then upconverted to produce a scaled estimation of Tx leakage 473. The Tx leakage estimator 428 may employ multipliers 472a-d and summers 474a-b to perform a complex multiplication of the baseband Tx signal 436 and the weight 424. The outputs of the summers 474a-b may be upconverted by upconverters 432a-b to form an estimated Tx leakage signal TxLE 434. The Tx leakage reducer 408 may subtract the estimated Tx leakage signal 434 from the amplified Rx signal 416 to remove Tx leakage 473 from the amplified Rx signal 416, thereby outputting only the desired Rx signal 477.

The baseband Tx signal 436 may include an inphase component (i.e., the baseband Tx signal Tx_I 436a) and a quadrature component (i.e., the baseband Tx signal Tx_Q 436b). The baseband Tx signal 436a can be written in the complex domain as TxBB=Tx_I+j*Tx_Q. The multipliers 440a-b and the summer 478 may upconvert the baseband Tx signal 436 to the Tx LO frequency. It may be assumed that the Tx LO I signal 441a is equal to cos(ω*t) and the Tx LO Q signal 441b is equal to sin(ω*t). The Tx LO signal 341 can be written in the complex domain as LO=cos(ω*t)+j sin(ω*t)=$e^{(j*\omega*t)}$, where ω is the Tx LO frequency and t is time.

Because the Tx leakage estimator 428 applies direct current (DC) signals (e.g., weights 424a-b) to the baseband Tx signal I 436a and the baseband Tx signal Q 436b, the estimated Tx leakage signal 434 is void of any desired Rx signal 477. Therefore, when the estimated Tx leakage signal 434 is subtracted from the Rx signal 412 at the Tx leakage reducer 408, none of the desired Rx signal 477 is canceled or attenuated. Thus, the desired Rx signal 477 is not degraded by the Tx leakage reducer 408. This allows for only Tx leakage 473 to be canceled from the Rx signal 412, leaving only the desired Rx signal 377. Furthermore, the removal of the desired Rx signal by the weight learning module 420, based on zero correlation of the baseband Rx signal and the baseband Tx signal 436, allows the Rx and Tx frequency signals to be very close to each other or even overlap. Thus, according to the systems and methods described herein, Rx and Tx frequency bands may be adjacent to each other, or may even overlap one another, while still maintaining a strong desired Rx signal 477 with negligible levels of Tx leakage 473.

Figure 5:
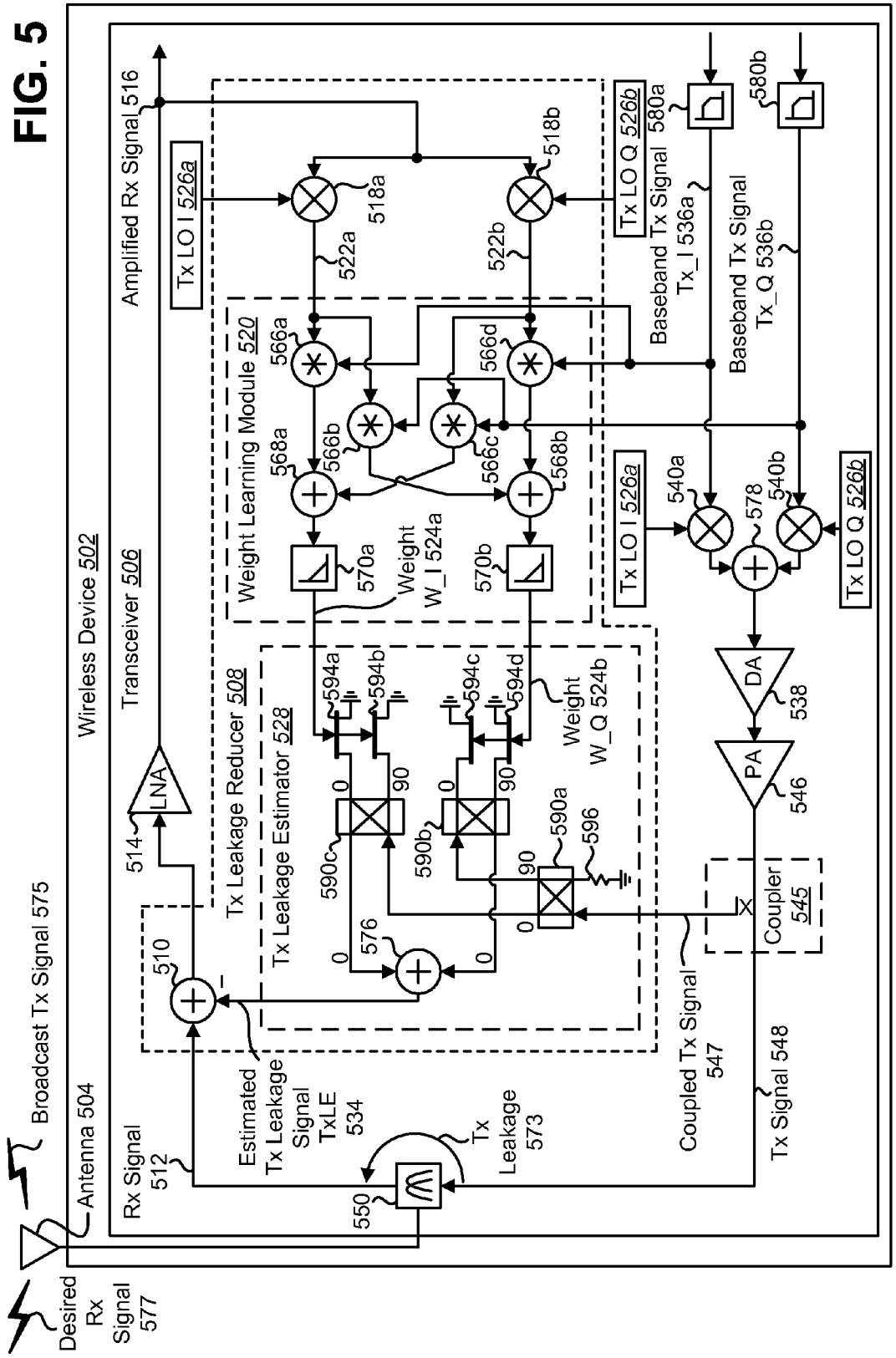
FIG. 5 is a block diagram illustrating yet another configuration of a wireless device that includes Tx leakage cancellation.

FIG. 5 is a block diagram illustrating yet another configuration of a wireless device 502 that includes Tx leakage cancellation. The wireless device 502 may include an antenna 504 and a transceiver 506. The antenna 504 may receive a desired Rx signal 577 and may transmit a broadcast Tx signal 575. The transceiver 506 in FIG. 5 may be one example of the transceiver 106 described in connection with FIG. 1.

The transceiver 506 may include a Tx leakage reducer 508, a weight learning module 520 and a Tx leakage estimator 528. The Tx leakage reducer 508 may include a summer 510 and a low noise amplifier (LNA) 514. The weight learning module 520 may include multipliers 566a-d, summers 568a- and narrow pass filters 570a-b. The Tx leakage estimator 528 may include passive components such as transistors 594 a-d, quadrature hybrids 590a-c, a resistor 596 and a power combiner 576.

As used herein, a passive element is one that generates no extra noise and draws zero current. It should be appreciated that transistors, when biased with zero current, may serve as passive elements.

The weight learning module 520 and the Tx leakage estimator 528 may be part of a feedback loop. The baseband Tx signal 536 may be separated into an I component and a Q component. For example, the baseband Tx signal 536 may be separated into the baseband Tx signal Tx_I 536a and the baseband Tx signal Tx_Q 536b.

In some configurations, such as illustrated in FIG. 5, the Tx leakage estimator 528 may include only passive elements. When active elements are used in the Tx leakage estimator 528, undesired noise may be added to the feedback loop, resulting in higher noise at the input of the low noise amplifier (LNA) 514. Further, in addition to generating noise at the Tx leakage estimator 528, active elements consume power. By reducing the number of active elements and replacing them with passive elements, power is conserved.

The transceiver 506 may also include a duplexer 550, downconverters 518a-b, upconverters 540a-b, a summer 578, a power combiner 576, baseband filters 580a-b, a power amplifier (PA) 546 and a drive amplifier (DA) 538. The downconverter 518a may be driven by a Tx local oscillator (LO) I 526a and the downconverter 518b may be driven by a Tx local oscillator (LO) Q 526b. The upconverter 540a may also be driven by the Tx local oscillator (LO) I 526a and the upconverter 540b may also be driven by the Tx local oscillator (LO) Q 526b. The summer 578 and the power combiner 576 may combine the I and Q components into one signal. For example, the output of the power combiner 576 may be an estimated Tx leakage signal TxLE 534.

The wireless device 502 may receive a desired Rx signal 577 at the antenna 504. The desired Rx signal 577 may be filtered/isolated by the duplexer 550 to obtain an Rx signal 512. In other words, the duplexer 550 may output an Rx signal 512 while simultaneously processing a Tx signal 548 for transmission. The Tx signal 548 may be transmitted at the antenna 504 as a broadcast Tx signal 575. In some configurations, the Tx signal 548 may leak into the Rx signal 512 in the form of Tx leakage 573. As described previously, the duplexer 550 may isolate the frequency of the desired Rx signal 577 and filter out undesired signal frequencies. In the case of multiple signals and/or bands, multiple duplexers 550 may be employed.

The Rx signal 512 may be processed by the Tx leakage reducer 508. The Tx leakage reducer 508 may first sum the Rx signal 512 with an estimated Tx leakage signal TxLE 534 to subtract out the estimated Tx leakage signal TxLE 534. The output of the summer 510 may be amplified by a low noise amplifier (LNA) 514 to obtain an amplified Rx signal 516.

The amplified Rx signal 516 may be downconverted. For example, the amplified Rx signal 516 may be downconverted at the downconverter 518a using the Tx local oscillator (LO) I 526a to produce a feedback I signal 522a. The amplified Rx signal 516 may also be downconverted at the downconverter 518b using the Tx local oscillator (LO) Q 526b to produce a feedback Q signal 522b.

The feedback I signal 522a and the feedback Q signal 522b may be provided to the weight learning module 520. The feedback I signal 522a and the feedback Q signal 522b may still include the desired Rx signal 577 as well as Tx leakage 573. The weight learning module 520 may perform complex multiplication using multipliers 566a-d and summers 568a-b. The feedback I signal 522a may be multiplied with the baseband Tx signal Tx_I 536a using a first multiplier 566a. The feedback I signal 522a may be multiplied with the baseband Tx signal Tx_Q 536b using a second multiplier 566b. The feedback Q signal 522b may be multiplied with the baseband Tx signal Tx_Q 536b using a third multiplier 566c. The feedback Q signal 522b may be multiplied with the baseband Tx signal Tx_I 536a using a fourth multiplier 566d. The output of the third multiplier 566c may be cross coupled and combined with the output of the first multiplier 566a using the first summer 568a. The output of the second multiplier 566b may be cross coupled and combined with the output of the fourth multiplier 566d using the second summer 568b.

The weight learning module 520 may also apply narrow pass filters 570a-b to the output signals from the summers 568a-b, respectively. The narrow pass filters 570a-b may produce a complex correlation coefficient (e.g., weight 524) between the feedback signal 522 and the Tx baseband signal 536. The complex multiplication of the feedback signal 522 and the Tx baseband signal 536 may produce a direct current (DC) signal due to correlated portions of these two signals and an alternating current (AC) signal due to uncorrelated portions of these two signals. The direct current (DC) signal, which is preserved by the narrow pass filters 570a-b, may indicate information about the Tx leakage magnitude and phase. The alternating current (AC) signal, which carries information about all other signals that are not correlated with the baseband Tx signal 536 (such as the desired Rx signal 577), may be suppressed to zero.

The Tx leakage estimator 528 may obtain the weight W_I 524a, the weight W_Q 524b and a coupled Tx signal 547 (obtained from the Tx signal 548 via a coupler 545). The Tx signal 548 may be generated by upconverting the baseband Tx signal 536 in mixers 540a-b and combining them in a summer 578. The output of the summer 578 may be amplified by a driver amplifier (DA) 538 and a power amplifier (PA) 546. By using the Tx signal 548, which has been upconverted to the Tx LO frequency, further upconversion is not required (e.g., no additional upconverters are needed inside the Tx leakage estimator 528. By avoiding further upconverstion, less noise is introduced into the feedback loop to pollute the estimated Tx leakage signal TxLE 534.

The coupler 545 at the output of the power amplifier (PA) 546 couples a portion of the Tx signal 548 to the reference input of the Tx leakage estimator 528. The Tx leakage estimator 528 may pass the coupled Tx signal 547 through the quadrature hybrid 590a. The quadrature hybrid 590a splits the coupled Tx signal 547 into an inphase (I) Tx signal (e.g., 0-degree) and a quadrature-phase (Q) Tx signal (e.g., 90-degree). In other words, the quadrature hybrid 590a may be a 90 degree passive phase splitter. The quadrature hybrid 590a may include an isolated port that requires a proper resistive termination (e.g., a resistor 596) to ground, as in a Lange coupler. The quadrature hybrid 590a may also be implemented as an RC circuit, an LC circuit or a transformer, which may not require resistive termination. As described herein, it is assumed that the quadrature hybrids 590a-c are implemented as Lange couplers or their lumped LC analogs. However, other possible implementations may be known to those skilled in the art.

The 0-degree port (direct port) of the quadrature hybrid 590a may be coupled to the input port of the quadrature hybrid 590c. The 90-degree port (coupled port) of the quadrature hybrid 590a may be coupled to the input port of the quadrature hybrid 590b. The 0-degree port (direct port) of the quadrature hybrid 590c may be coupled to the drain of a transistor 594a. The source of the transistor 594a may be coupled to ground. The gate of the transistor 594a may be coupled to the weight W_I 524a. The 90-degree port (coupled port) of the quadrature hybrid 590c may be coupled to the drain of a transistor 594b. The source of the transistor 594b may be coupled to ground. The gate of the transistor 594b may be coupled to the weight W_I 524a. The isolated port of the quadrature hybrid 590c serves as an output port and is connected to one of the inputs of the power combiner 576.

The 0-degree port (direct port) of the quadrature hybrid 590b may be coupled to the drain of a transistor 594c. The source of the transistor 594c may be coupled to ground. The gate of the transistor 594c may be coupled to the weight W_Q 524b. The 90-degree port (coupled port) of the quadrature hybrid 590b may be coupled to the drain of a transistor 594d. The source of the transistor 594d may be coupled to ground. The gate of the transistor 594d may be coupled to the weight W_Q 524b. The isolated port of the quadrature hybrid 590b serves as an output port and is connected to one of the inputs of the power combiner 576.

Transistors 594a-d generate a resistance between their drain and source terminals that is a function of the gate voltage (i.e., the weight 524 applied to the gates of the transistors 594a-d). Thus, the weight 524 may influence the resistance of the transistors 594, which then influences the output of the quadrature hybrids 590b-c. Due to the nature of Lange couplers, if the input port is driven by a 50-ohm signal source and the resistive terminations of the direct and coupled ports are also equal to 50-ohm, then no signal is delivered to the isolated port (the output). This is equivalent to the quadrature hybrid 590 having a gain of 0 for the signal at its input. If the resistive terminations of the direct and coupled ports are higher than 50-ohm, then the quadrature hybrid 590 couples the input signal to the isolated port (the output) with the same phase as the input signal. This is equivalent to the quadrature hybrid 590 having a positive gain.

The gain value depends on how far the direct and coupled port terminations are above 50-ohm: the higher their resistance, the higher the gain. The maximum positive gain is achieved when these terminations have an infinite impedance. If the resistive terminations of the direct and coupled ports are lower than 50-ohm, then the quadrature hybrid 590 couples the input signal to the isolated port (the output) with the 180-degree phase difference to the input signal. This is equivalent to the quadrature hybrid 590 having a negative gain. The gain value depends on how far the direct and coupled port terminations are below 50-Ohm: the lower their resistance, the higher the absolute value of the negative gain. The maximum negative gain is achieved when these terminations have zero impedance. Thanks to these properties of Lange couplers, the quadrature hybrids 590b-c, loaded by voltage-controlled transistors 594a-d, act as signal multipliers, i.e. they multiply a signal present at their input port by a signal present at the gates of transistors 594a-d and the result is outputted at the isolation port. The transistors 594a-d can be implemented as n-channel field effect transistors (FETs). The resistance of these transistors 594 increases when the gate voltage reduces and vice versa. Other implementations of the variable resistance transistors 594a-d are possible.

The outputs of the quadrature hybrid 590b and the quadrature hybrid 590c may be combined by the power combiner 576 to create the estimated Tx leakage signal TxLE 534. The overall functionality of the quadrature hybrids 590a-c, the variable resistance transistors 594 a-d and the power combiner 576 is similar to that of a reflection-type vector modulator, which allows the weights 524 a-b to control phase and amplitude of the estimated Tx leakage signal TxLE 534 without using active multipliers or upconverters. The estimated Tx leakage signal TxLE 534 may be provided to the Tx leakage reducer 508. The Tx leakage reducer 508 may subtract the estimated Tx leakage signal TxLE 534 from the Rx signal 512 to obtain the desired Rx signal 577 (as discussed above in relation to Equations 1-16).

Figure 6:
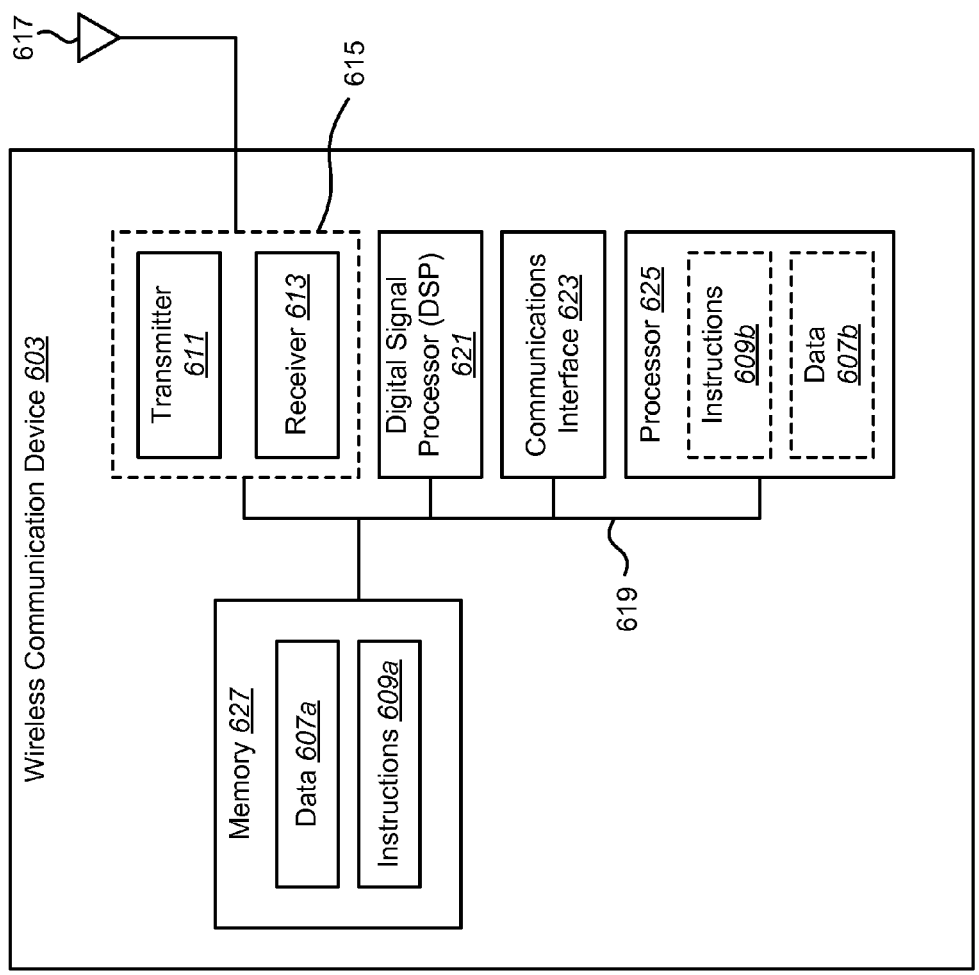
FIG. 6 illustrates certain components that may be included within a wireless communication device.

FIG. 6 illustrates certain components that may be included within a wireless communication device 603. The wireless communication device 603 may be an access terminal, a mobile station, a user equipment (UE), etc. The wireless communication device 603 includes a processor 625. The processor 625 may be a general purpose single- or multi-chip microprocessor (e.g., an ARM), a special purpose microprocessor (e.g., a digital signal processor (DSP)), a microcontroller, a programmable gate array, etc. The processor 625 may be referred to as a central processing unit (CPU). Although just a single processor 625 is shown in the wireless communication device 603 of FIG. 6, in an alternative configuration, a combination of processors (e.g., an ARM and DSP) could be used.

The wireless communication device 603 also includes memory 627. The memory 627 may be any electronic component capable of storing electronic information. The memory 627 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 607a and instructions 609a may be stored in the memory 627. The instructions 609a may be executable by the processor 625 to implement the methods disclosed herein. Executing the instructions 609a may involve the use of the data 607a that is stored in the memory 627. When the processor 625 executes the instructions 609, various portions of the instructions 609b may be loaded onto the processor 625, and various pieces of data 607b may be loaded onto the processor 625.

The wireless communication device 603 may also include a transmitter 611 and a receiver 613 to allow transmission and reception of signals to and from the wireless communication device 603 via an antenna 617. The transmitter 611 and receiver 613 may be collectively referred to as a transceiver 615. The wireless communication device 603 may also include (not shown) multiple transmitters, multiple antennas, multiple receivers and/or multiple transceivers.

The wireless communication device 603 may include a digital signal processor (DSP) 621. The wireless communication device 603 may also include a communications interface 623. The communications interface 623 may allow a user to interact with the wireless communication device 603.

The various components of the wireless communication device 603 may be coupled together by one or more buses, which may include a power bus, a control signal bus, a status signal bus, a data bus, etc. For the sake of clarity, the various buses are illustrated in FIG. 6 as a bus system 619.

Figure 7:
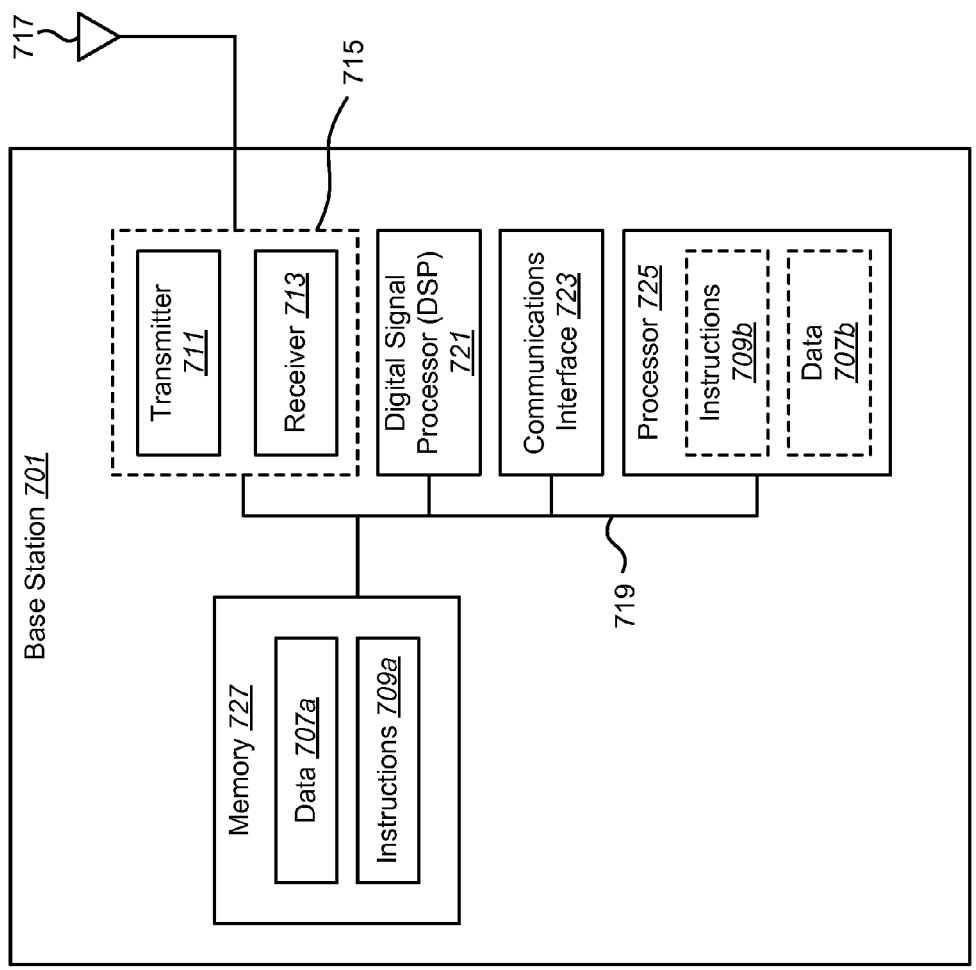
FIG. 7 illustrates certain components that may be included within a base station.

FIG. 7 illustrates certain components that may be included within a base station 701. A base station may also be referred to as, and may include some or all of the functionality of, an access point, a broadcast transmitter, a NodeB, an evolved NodeB, etc. The base station 701 includes a processor 725. The processor 725 may be a general purpose single- or multi-chip microprocessor (e.g., an ARM), a special purpose microprocessor (e.g., a digital signal processor (DSP)), a microcontroller, a programmable gate array, etc. The processor 725 may be referred to as a central processing unit (CPU). Although just a single processor 725 is shown in the base station 701 of FIG. 7, in an alternative configuration, a combination of processors (e.g., an ARM and DSP) could be used.

The base station 701 also includes memory 727. The memory 727 may be any electronic component capable of storing electronic information. The memory 727 may be embodied as random access memory (RAM), read only memory (ROM), magnetic disk storage media, optical storage media, flash memory devices in RAM, on-board memory included with the processor, EPROM memory, EEPROM memory, registers and so forth, including combinations thereof.

Data 707a and instructions 709a may be stored in the memory 727. The instructions 709a may be executable by the processor 725 to implement the methods disclosed herein. Executing the instructions 709a may involve the use of the data 707a that is stored in the memory 727. When the processor 725 executes the instructions 709a, various portions of the instructions 709b may be loaded onto the processor 725, and various pieces of data 707b may be loaded onto the processor 725.

The base station 701 may also include a transmitter 711 and a receiver 713 to allow transmission and reception of signals to and from the base station 701. The transmitter 711 and receiver 713 may be collectively referred to as a transceiver 715. An antenna 717 may be electrically coupled to the transceiver 715. The base station 701 may also include (not shown) multiple transmitters, multiple receivers, multiple transceivers and/or multiple antennas.

The base station 701 may include a digital signal processor (DSP) 721. The base station 701 may also include a communications interface 723. The communications interface 723 may allow a user to interact with the base station 701.

The various components of the base station 701 may be coupled together by one or more buses, which may include a power bus, a control signal bus, a status signal bus, a data bus, etc. For the sake of clarity, the various buses are illustrated in FIG. 7 as a bus system 719.

In the above description, reference numbers have sometimes been used in connection with various terms. Where a term is used in connection with a reference number, this is meant to refer to a specific element that is shown in one or more of the figures. Where a term is used without a reference number, this is meant to refer generally to the term without limitation to any particular figure.

The proposed transceiver 106 architecture may be used in wireless communication links, wired communication links, optical communication links, etc. Communications in a wireless communication system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO and MISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system may utilize both single-input and multiple-output (SIMO) and multiple-input and multiple-output (MIMO). The wireless communication system may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The $3^{rd}$ Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

3GPP specifications are based on evolved Global System for Mobile Communications (GSM) specifications, which are generally known as the Universal Mobile Telecommunications System (UMTS). 3GPP standards are structured as releases. Discussion of 3GPP thus frequently refers to the functionality in one release or another. For example, Release 99 specifies the first UMTS third generation (3G) networks, incorporating a CDMA air interface. Release 6 integrates operation with wireless local area networks (LANs) and adds high speed uplink packet access (HSUPA). Release 8 introduces dual downlink carriers and Release 9 extends dual carrier operation to uplink for UMTS.

CDMA2000 is a family of third generation (3G) technology standards that use code division multiple access (CDMA) to send voice, data and signaling between wireless devices. CDMA2000 may include CDMA2000 1X, CDMA2000 EV-DO Rev. 0, CDMA2000 EV-DO Rev. A and CDMA2000 EV-DO Rev. B. 1x or 1xRTT refers to the core CDMA2000 wireless air interface standard. 1X more specifically refers to 1 times Radio Transmission Technology and indicates the same radio frequency (RF) bandwidth as used in IS-95. 1xRTT adds 64 additional traffic channels to the forward link. EV-DO refers to Evolution-Data Optimized EV-DO is a telecommunications standard for the wireless transmission of data through radio signals.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation, and details of the systems, methods and apparatus described herein without departing from the scope of the claims.

What is claimed is:

1. A transceiver for reducing transmit signal leakage, comprising:
 a first downconverter having an input configured between a low noise amplifier and a second downconverter, wherein the first downconverter downconverts a receive signal to produce a feedback signal;
a weight learning module that correlates the feedback signal with a baseband transmit signal to obtain a weight;
a transmit leakage estimator that obtains an estimated transmit leakage signal based on the weight and a second transmit signal; and
a summer that reduces transmit leakage in the receive signal before the receive signal is downconverted by the second downconverter based on the estimated transmit leakage signal.

2. The transceiver of claim 1, wherein the receive signal comprises transmit leakage and a desired receive signal.

3. The transceiver of claim 1, wherein the weight learning module comprises multipliers, summers, and narrow pass filters.

4. The transceiver of claim 1, wherein an input of the summer is coupled to an output of a low noise amplifier.

5. The transceiver of claim 1, wherein an output of the summer is coupled to an input of a low noise amplifier.

6. The transceiver of claim 1, wherein the summer subtracts the estimated transmit leakage signal from the receive signal to obtain a desired receive signal.

7. The transceiver of claim 6, wherein the estimated transmit leakage signal does not comprise any portion of the desired receive signal, due to zero correlation between a baseband receive signal and the baseband transmit signal.

8. The transceiver of claim 1, wherein the weight is obtained by determining signal gain due to correlated portions of the feedback signal and the baseband transmit signal.

9. The transceiver of claim 1, wherein the weight learning module performs complex multiplication of the feedback signal and the baseband transmit signal to produce a DC signal due to correlated portions of the feedback signal and the baseband transmit signal and an AC signal due to uncorrelated portions of the feedback signal and the baseband transmit signal, wherein the weight learning module comprises one or more filters to preserve the DC signal and suppress the AC signal, and wherein the weight is said DC signal.

10. The transceiver of claim 1, wherein the transmit leakage estimator comprises only passive components that draw zero current.

11. The transceiver of claim 1, wherein the transmit signal leakage leaks onto the receive signal through a duplexer.

12. The transceiver of claim 11, wherein the duplexer is implemented using one of surface acoustic wave filters, bulk acoustic wave filters, ceramic filters, LC filters and transmission filters.

13. The transceiver of claim 1, wherein the transmit leakage estimator comprises:
multiple quadrature hybrids;
multiple transistors; and
a power combiner.

14. The transceiver of claim 1, wherein the second transmit signal is a coupled transmit signal obtained from an upconverted transmit signal, wherein the upconverted transmit signal is generated by upconverting the baseband transmit signal.

15. The transceiver of claim 1, wherein the second transmit signal is the baseband transmit signal.

16. A method for reducing transmit signal leakage, comprising:
downconverting a receive signal using first downconverter having an input configured between a low noise amplifier and a second downconverter, wherein the first downconverter to produces a feedback signal;
correlating the feedback signal with a baseband transmit signal to obtain a weight;
obtaining an estimated transmit leakage signal based on the weight and a second transmit signal; and
summing the estimated transmit leakage signal with the receive signal before the receive signal is downconverted by the second downconverter to reduce the transmit leakage in the receive signal.

17. The method of claim 16, wherein the receive signal comprises transmit leakage and a desired receive signal.

18. The method of claim 16, wherein the weight is obtained using multipliers, summers and narrow pass filters.

19. The method of claim 16, wherein the transmit leakage in the receive signal is reduced using a summer that subtracts the estimated transmit leakage signal from the receive signal to obtain a desired receive signal.

20. The method of claim 19, wherein an input of the summer is coupled to an output of a low noise amplifier.

21. The method of claim 19, wherein an output of the summer is coupled to an input of a low noise amplifier.

22. The method of claim 19, wherein the estimated transmit leakage signal does not comprise any portion of the desired receive signal, due to zero correlation between a baseband receive signal and the baseband transmit signal.

23. The method of claim 16, wherein the weight is obtained by determining signal gain due to correlated portions of the feedback signal and the baseband transmit signal.

24. The method of claim 16, wherein said correlating the feedback signal with a baseband transmit signal comprises:
performing complex multiplication of the feedback signal and the baseband transmit signal to produce a DC signal due to correlated portions of the feedback signal and the baseband transmit signal and an AC signal due to uncorrelated portions of the feedback signal and the baseband transmit signal; and
filtering the DC signal and the AC signal to preserve the DC signal and suppress the AC signal,
wherein the weight is said DC signal.

25. The method of claim 16, wherein the estimated transmit leakage signal is obtained using a transmit leakage estimator that comprises only passive components that draw zero current.

26. The method of claim 16, wherein the transmit signal leakage leaks onto the receive signal through a duplexer.

27. The method of claim 26, wherein the duplexer is implemented using one of surface acoustic wave filters, bulk acoustic wave filters, ceramic filters, LC filters and transmission filters.

28. The method of claim 16, wherein the transmit leakage estimate is obtained using a circuit that comprises:
multiple quadrature hybrids;
multiple transistors; and
a power combiner.

29. The method of claim 16, wherein the second transmit signal is a coupled transmit signal obtained from an upconverted transmit signal, wherein the upconverted transmit signal is generated by upconverting the baseband transmit signal.

30. The method of claim 16, wherein the second transmit signal is the baseband transmit signal.

31. A computer-program product for reducing transmit signal leakage on a transceiver, the computer-program product comprising a non-transitory computer-readable medium having instructions thereon, the instructions comprising:
code for causing the transceiver to downconvert a receive signal using first downconverter having an input configured between a low noise amplifier and a second downconverter, wherein the first downconverter produces a feedback signal;

code for causing the transceiver to correlate the feedback signal with a baseband transmit signal to obtain a weight;

code for causing the transceiver to obtain an estimated transmit leakage signal based on the weight and a second transmit signal; and code for causing the transceiver to sum the estimated transmit leakage signal with the receive signal before the receive signal is downconverted by the second downconverter to reduce the transmit leakage in the receive signal.

32. The computer-program product of claim 31, wherein the receive signal comprises transmit leakage and a desired receive signal.

33. The computer-program product of claim 31, wherein the weight is obtained using multipliers, summers, and narrow pass filters.

34. The computer-program product of claim 31, wherein the transmit leakage in the receive signal is reduced using a summer that subtracts the estimated transmit leakage signal from the receive signal to obtain a desired receive signal.

35. The computer-program product of claim 34, wherein an input of the summer is coupled to an output of a low noise amplifier.

36. The computer-program product of claim 34, wherein an output of the summer is coupled to an input of a low noise amplifier.

37. A transceiver for reducing transmit signal leakage, comprising:

means for downconverting a receive signal having an input configured between a low noise amplifier and a second downconverter, wherein the means for downconverting to produces a feedback signal;

means for correlating the feedback signal with a baseband transmit signal to obtain a weight;

means for obtaining an estimated transmit leakage signal based on the weight and a second transmit signal; and means for summing the estimated transmit leakage signal with the receive signal before the receive signal is downconverted by the second downconverter to reduce the transmit leakage in the receive signal.

38. The transceiver of claim 37, wherein the receive signal comprises transmit leakage and a desired receive signal.

39. The transceiver of claim 37, wherein the means for correlating the feedback signal with the transmit signal comprise multipliers, summers, and narrow pass filters.

40. The transceiver of claim 37, wherein the means for reducing the transmit leakage in the receive signal comprises a summer that subtracts the estimated transmit leakage signal from the receive signal to obtain a desired receive signal.

41. The transceiver of claim 40, wherein an input of the summer is coupled to an output of a low noise amplifier.

42. The transceiver of claim 40, wherein an output of the summer is coupled to an input of a low noise amplifier.

* * * * *